(No Model.)  2 Sheets—Sheet 1.

O. B. HALL.
NIPPLE HOLDER.

No. 587,478.  Patented Aug. 3, 1897.

Witnesses:
Walter E. Lombard
M. E. Bonditch

Inventor:
Osborn B. Hall
per T. W. Porter Atty (No Model.)  O. B. HALL.  2 Sheets—Sheet 2.
NIPPLE HOLDER.

No. 587,478.   Patented Aug. 3, 1897.

Witnesses:
Eugene Humphrey
John Q. Adams

Inventor:
Osborn B. Hall

UNITED STATES PATENT OFFICE.

OSBORN B. HALL, OF MALDEN, MASSACHUSETTS.

NIPPLE-HOLDER.

SPECIFICATION forming part of Letters Patent No. 587,478, dated August 3, 1897.

Application filed February 17, 1896. Serial No. 579,531. (No model.)

*To all whom it may concern:*

Be it known that I, OSBORN B. HALL, of Malden, in the county of Middlesex and State of Massachusetts, have invented a new and useful Improvement in Nipple-Holders, which will, in connection with the accompanying drawings, be hereinafter fully described, and specifically defined in the appended claims.

Figure 1:
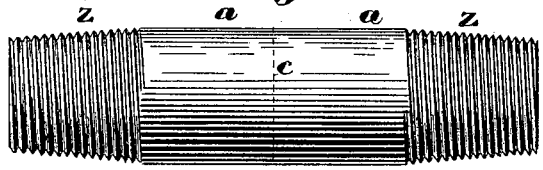
Figure 2:
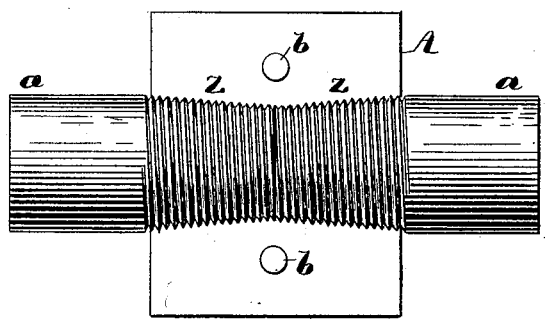
Figure 3:
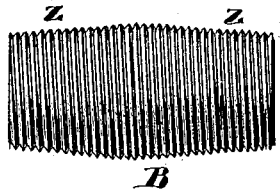
Figure 4:
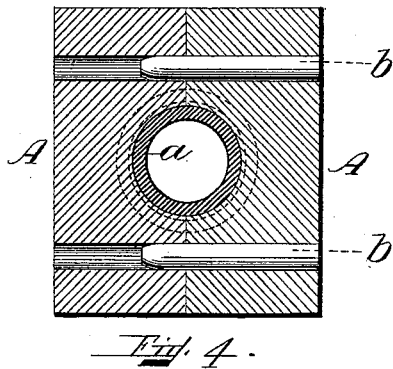

In said drawings, Figure 1 is a plan view of a common nipple threaded at the ends in the usual manner. Fig. 2 is a plan view showing the nipple represented in Fig. 1 as severed at the center of its length, the two parts reversed and secured in a vise or holder preparatory to cutting the outer ends. Fig. 3 is a plan view of a "close" nipple, so called. Fig. 4 is a vertical section of the holder complete, (only one-half of which is shown in Fig. 2,) taken on a line as through the dowels and viewed as from the left of Fig. 2 and as when in practical use.

In the preparation of material to be used in the business of piping houses and other buildings and in the great variety of uses of piping of many sizes one of the most common requirements is what are termed "nipples"—that is, pieces of pipe of the desired length threaded at each end and secured to couplings or fittings by which the direction of the pipe is varied to the desired extent.

Among the required nipples is what is known as a "close" nipple—that is, a nipple that is practically and generally actually all inserted in the fittings. This class of nipples are usually prepared at the factory, and the threads cut upon the two tapering ends must meet at the middle, and hence they cannot, like longer nipples, be made as wanted, but must be cut by special means. My improved method of forming them is to cut the pipe in double lengths, as shown in Fig. 1, where $a$ $a$ represent the uncut portions to be severed at $c$, and $z$ $z$ represent the threaded outer ends. If this nipple was to be of the length shown in Fig. 1, it would constitute a completed nipple, and in threading said ends $z$ $z$ the pipe could be held in a common pipe-vise, gripping part $a$ while being cut; but for many purposes the nipple must be as short as shown in Fig. 3, and to effect this I sever the pipe at the dotted line $c$ and then insert ends $z$ $z$ in a duly threaded die or vise A, after which, by a double-acting machine, the threads are cut on ends $a$, so that the completed nipple is formed as threaded at both ends, as shown in Fig. 3. By this means the double-length pieces of pipe, as shown in Fig. 1, are cut by a double-acting machine—that is, a machine that will cut both ends at the same time—and then, after cutting the pieces in halves, as stated, at line $c$, the halves are inserted in the holder A, and a double-acting machine then threads said ends $a$. The holder A is divided at the center, and the halves are accurately held by dowel-pins $b$ $b$, and hence it is but the work of a moment to insert or remove the nipples, as the separation of the halves of the holder sets the nipples free, so that they are removed and replaced by others with practically no loss of time, the holder A being held in a chuck or vise during the act of cutting.

By this method of preparing close nipples great saving is expected in their cost, as the ends of two nipples are in fact cut at the same time, as in Fig. 1, and then two nipples are cut at the same time, as in Fig. 2, so that the manufacture goes on with the same rapidity as if all the nipples were of greater lengths instead of their being of the close variety.

Having thus described my invention, what I claim as new, and desire to secure by Letters Patent, is—

1. A divided holder A, the two halves of which have a semicircular cut of unequal depth across their meeting faces provided with reverse threads, and thus formed to correspond when united with the threaded nipple ends $z$, $z$, to be held therein; and suitable means for detachably uniting said halves to form the complete holder for the purpose specified.

2. A two-part nipple-holder A, united by dowel-pins $b$, and threaded through the center with opposite right and left threads adapted to receive and hold the threaded ends $z$, $z$, of two partially-threaded close nipples, while properly presenting their opposite uncut ends $a$, $a$, to be simultaneously acted upon and threaded, substantially as specified.

OSBORN B. HALL.

Witnesses:
T. W. PORTER,
M. E. BONDITCH.